No. 863,204. PATENTED AUG. 13, 1907.
W. McKEE.
PUNCHING AND SHEARING MACHINE.
APPLICATION FILED DEC. 26, 1906.

WITNESSES:
J. Herbert Bradley
Charles Barnett

INVENTOR
Willis McKee
by Christy and Christy
Atty's

UNITED STATES PATENT OFFICE.

WILLIS McKEE, OF ELYRIA, OHIO.

PUNCHING AND SHEARING MACHINE.

No. 863,204. Specification of Letters Patent. Patented Aug. 13, 1907.

Application filed December 26, 1906. Serial No. 349,413.

*To all whom it may concern:*

Be it known that I, WILLIS McKEE, residing at Elyria, in the county of Lorain and State of Ohio, a citizen of the United States, have invented or discovered certain new and useful Improvements in Punching and Shearing Machines, of which improvement the following is a specification.

The invention described herein relates to certain improvements in machines for punching and cutting a plate or bar having transverse ribs or abutments, into sections, forming tie-plates for rails.

The invention has for its object a construction wherein the plate can be brought quickly and easily into proper position for the simultaneous operation of the punches and movable member of the shear.

The invention is hereinafter more fully described and claimed.

Figure 1:
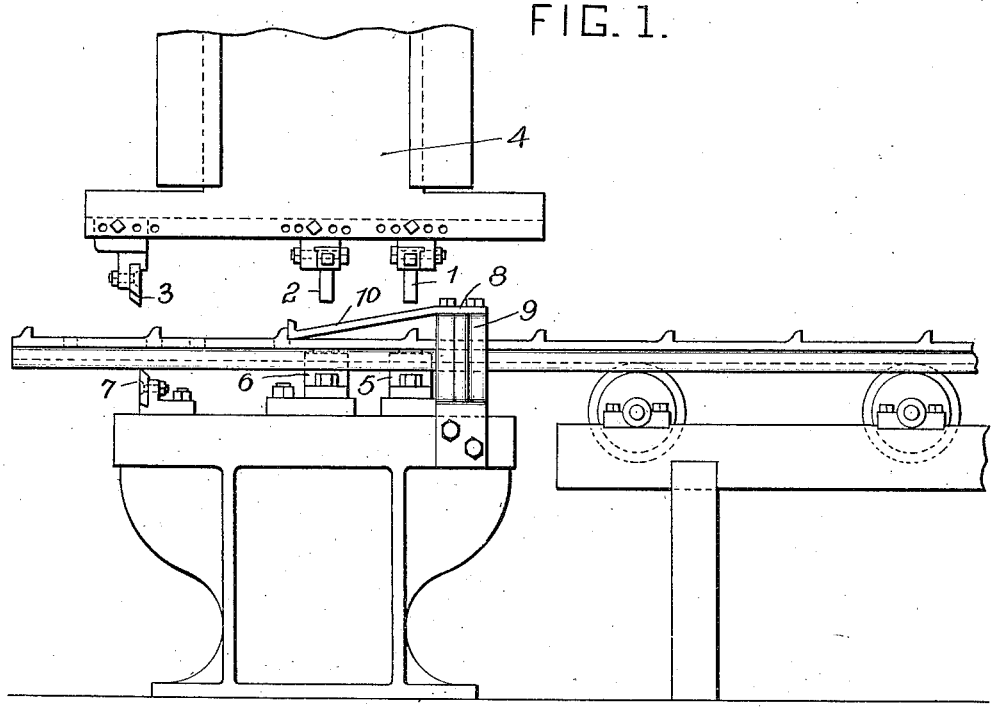
Figure 2:
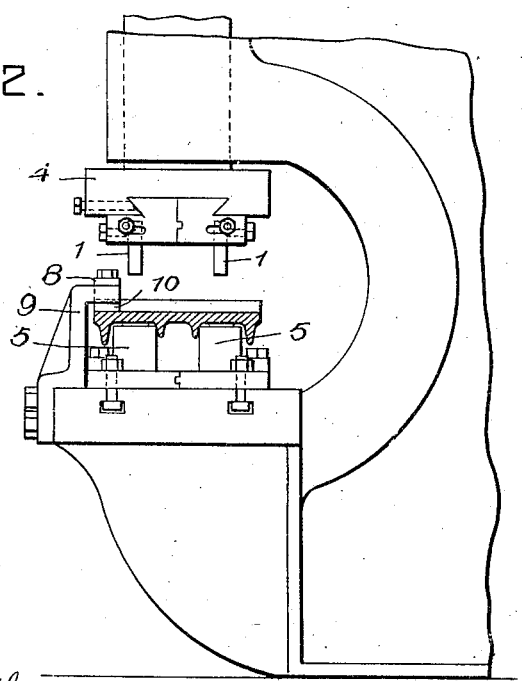

In the accompanying drawings forming a part of this specification, Figure 1 is a front elevation of a machine embodying my improvement and Fig. 2 is an end elevation of the same.

In the practice of my invention, the punches 1 and 2, and the shear blade 3 are secured in any suitable manner to the reciprocating head 4 of the press. The female dies 5 and 6 and the stationary blade 7 are secured to the bed plate of the machine. The dies and punches are constructed to be independently adjustable on the bed plate and head respectively, as the spacing of the holes in the tie plate will vary in accordance with the size of rail with which they are to be used. The two elements of the shear mechanism are also adjustable relative to the punches as the length of the tie will also vary with the size of the rail.

A stop is employed for insuring the proper position of the plate or bar for punching and shearing. In the construction shown, this stop consists of a spring arm 8 secured to a bracket 9 fastened to the bed plate at one side of the path of movement of the plate or bar. This arm is provided with an angular extension 10 which extends over the bar or plate so as to engage the transverse ribs on the plate. The stop is so constructed as to yieldingly bear upon the plate at all times and being raised by a passing rib will drop down the rib as soon as it passes.

In using the machine the bar or plate is moved along after each shearing and punching operation until a rib has passed under the stop, when the movement of the plate is reversed until the rib which has passed under the stop bears firmly against the same.

It will be observed that the last punch is separated from the shears by a distance approximately equal to the length of tie plate to be formed and that the stop is so constructed and arranged preferably to engage a rib intermediate of the last punch and the shear mechanism.

I claim herein as my invention:

1. The combination of stationary dies and shear blade, reciprocating punches and shear blade, and a yielding stop arranged to permit the passage of an upwardly projecting portion of the plate or bar being operated on and engage such portion after its passage under the stop.

2. The combination of stationary dies and shear blade, reciprocating punches and shear blade, a stop arranged to engage an upwardly projecting portion of the plate or bar being operated on and automatically movable from and into the path of movement of such projecting portion.

3. The combination of stationary dies and shear blade, and a yielding stop arranged to engage a projecting portion of the plate or bar, being operated on while such projecting portion is between the shear blades and punches.

In testimony whereof, I have hereunto set my hand.

WILLIS McKEE.

Witnesses:
A. E. ADAMS,
J. L. BARNARD.